Patented Oct. 6, 1942

2,297,909

UNITED STATES PATENT OFFICE 2,297,909

METHOD OF LUBRICATION AND OF TREATING GEARS

George Leonard Neely, Bruce B. Farrington, and Victor N. Borsoff, Berkeley, Calif., assignors to Standard Oil Company of California, San Francisco, Calif., a corporation of Delaware No Drawing. Application April 14, 1936, Serial No. 74,394

2 Claims. (Cl. 148—7)

This invention relates to the treatment of metallic frictional surfaces of machine elements and especially to a treatment which prevents scuffing or seizing of moving mechanical elements during the breaking-in process.

Because of the increased power and increased speed of moving parts of recently designed automobiles, it has been found that formerly suitable lubricants are not capable of providing safe lubrication. This is especially true during the breaking-in process and in the case of cars provided with hypoid gears. Various lubricants have been developed in an effort to meet the extreme requirements necessary to insure absolutely safe lubrication under the high pressures and sliding friction encountered in modern machines.

The problem of adequately lubricating hypoid gears has become particularly acute and lubricants which have been provided for these gears can be classified into two general types, namely: (1) corrosive extreme pressure lubricants containing for instance free sulfur or corrosive sulfur compounds, and (2) milder extreme pressure lubricants containing non-corrosive compounds of sulfur or other materials which eventually react with the metallic surface being lubricated to form a protective film which prevents scuffing or seizure. The significance of the term "non-corrosive extreme pressure lubricant" is in general well understood in the lubrication art. As an example of the line of division between corrosive and non-corrosive extreme pressure lubricants, such a lubricant of the sulfur-bearing type is regarded as corrosive if it darkens a polished copper strip immersed in the lubricant for one-half hour at 300° F., and is regarded as non-corrosive if no discoloration occurs under these conditions.

One type of non-corrosive lubricant suitable for use in this invention is a mineral oil containing a sulfurized fatty oil and lead naphthenate.

In testing gears and gear lubricants, we have found two characteristics to be generally true: first, that lubricants containing free sulfur or other distinctly corrosive materials used in corrosive extreme pressure lubricants, allow new gears to be safely "broken-in" under heavy loads with little danger of seizure or scuffing. However, such lubricants are not desirable for the lubrication of well "run in" gears, because of detrimental effects on bearings and other parts and because of an accelerated rate of wear produced on the gears themselves.

The second effect which has been found to be true is that less corrosive extreme pressure lubricants, such as are satisfactory for well "run in" gears are not as desirable for use during the breaking-in period as are the more corrosive lubricants.

One proposed solution of the above contradictory requirements is to provide two different types of lubricants, that is, a highly corrosive extreme pressure lubricant for use during "running in" of the gears, and a milder non-corrosive lubricant for use after the gears have been properly "run in." This procedure is unsatisfactory in that there is always the danger that the wrong type of lubricant may be sold to the machine owner for use during the breaking-in period. Furthermore, this procedure involves a multiplication of the number of lubricants to be supplied to and carried by filling stations, garages, and the like. From a practical standpoint, it is therefore highly desirable that one lubricant should suffice for lubrication of gears both during the breaking-in process and throughout the life of the machine.

Accordingly, it is an object of the invention to provide a process of treating gears and other mechanical elements subject to metal to metal contact, so that all danger of scuffing or seizing is avoided during the breaking-in process, even though non-corrosive lubricants are used and the raw gears or other elements are immediately run under conditions which would normally produce scuffing such as heavy loads and high speeds.

Another object of the invention is to form by chemical action an integral thin tenacious coating on the teeth of gears prior to "running in" and then to "run in" such gears with a mild or non-corrosive extreme pressure lubricant.

A still further object of the invention is to provide an integral thin tenacious coating on the piston rings and/or cylinder walls of an internal combustion engine by chemical reaction with the surfaces, whereby breaking in of these parts is facilitated and scoring is avoided.

Ferrous metal surfaces may be treated according to our invention with various reagents and in a great number of ways to form reaction products with the metal surface and to give the desired action. Those reaction products which have been found to be efficient for the purposes of this invention, include the type produced by corrosive extreme pressure lubricants. It is obvious that in all cases strength of treating agent, temperature and time of treatment, should be adjusted to provide a non-flaky, thin, even tenacious film on the metal surfaces. The necessary conditions and adjustments are within the knowledge and are apparent to those skilled in the metal treating art. It is also apparent that in the case of treatment of gears either the entire gear or only the teeth thereof may be treated.

Three general types of treatment can be utilized:

A. *Treatment with gases.*—As an example of this type, iron sulfide films may be formed according to the invention by exposing heated or unheated gears to fumes of sulfur, hydrogen sulfide, waste gases containing the above or gases that liberate sulfur on contact with the hot gears.

B. *Treatment with liquids.*—In this type of process, gears may be dipped, sprayed or painted with aqueous solutions of hydrogen sulfide, metal sulfides, polysulfides, etc., and subsequently dried and heated, when necessary, to form iron sulfide films on the metallic surface. Likewise, the gears may be treated with ordinary or colloidal suspensions of sulfur and subsequently heated. Solutions of compounds capable of reacting with ferrous metals to form suitable films thereon, as well as sulfurized fats and the usual well known types of corrosive extreme pressure lubricants may all be used to form a film as contemplated by this invention.

This treatment may be combined with a tempering operation by quenching in a liquid, such as water or mineral oil containing a treating reagent which will produce a film suitable for our purposes. Likewise, such a process may be carried out in two steps, for example: quenching first in the usual substantially inert liquids and while the metal is still hot from this tempering operation treating to form a film as taught in the present specification. Obviously, it is also possible to reverse the above order of steps.

C. *Treatment with solids.*—Another mode of operation is to dust the gears with sulfur or a sulfur-releasing compound. The dust should be held in contact with the metal when subsequent heating steps are involved, by suitable means such as adherent liquid films provided on the gear or by other expedients such as a binder mixed with the sulfur.

To exemplify specifically processes operative for the purposes of this invention, the following four methods of treatment together with test data on the surfaces produced thereby are described:

*Method No. 1.*—Ferrous metal such as either hard or soft steel is immersed for four hours in an extreme pressure lubricant containing 2% free sulfur. The temperature is maintained at about 300° F. during the treatment. The extreme pressure lubricant here used is of the corrosive type because of the free sulfur present.

*Method No. 2.*—Sulfurized lard oil containing 15% sulfur is used in this treatment. Steel to be treated is immersed for periods varying from 20 seconds to 10 minutes in the lard oil which is maintained at a temperature of the order of 500° F.

*Method No. 3.*—A hot aqueous sulfide or polysulfide solution is prepared by adding powdered sulfur to either caustic soda or lime water and ferrous metal dipped therein for a few minutes until a smooth black to greyish film is formed.

*Method No. 4.*—An aqueous solution containing 10% $H_3PO_4$ and saturated with $Fe_3(PO_4)_2$ is used to form a phosphate coating. Ferrous surfaces were treated with this solution for periods of 30 minutes to 1½ hours.

The following data obtained on testing machines of well known types show clearly the benefit of treating metallic surfaces according to the invention:

*Almen machine test data\**

| Type of lubricant use during test | Maximum pan load on untreated soft steel | Maximum pan load on treated soft steel | |
|---|---|---|---|
| | | Method #1 | Method #2 |
| Straight Pennsylvania lubricant | 8 | 14 | |
| Non-corrosive sulfur bearing extreme pressure lubricant | 10 | 29 | 27 |

*Timken machine data\**

| Type of lubricant used during test | Maximum total load on untreated hardened steel | Maximum total load on treated hardened steel (method #1) |
|---|---|---|
| Non-corrosive sulfur bearing extreme pressure lubricant | *Pounds* 700 | *Pounds* 1,300 |

*\*Almen machine ran at 600 R. P. M. (40 ft. per min.) and loaded at the rate of 2 lbs. per 10 seconds.*
*Timken machine ran at 800 R. P. M. (400 ft. per min.) and loaded at the rate of 100 lbs. per 30 seconds. This latter loading rate was accelerated over that usually used to more nearly duplicate conditions of heavy loads and high speeds during breaking in.*

*Third testing machine \**

[Operating conditions: Speed: 534. R. P. M.; rolling ratio: 14.6 to 1; loading rate 8.35 pounds per second]

| Run No.— | Lubricant | Treatment | Load at failure |
|---|---|---|---|
| 455 | Non-corrosive sulfur-bearing extreme pressure lubricant. | None | 85 |
| 456 | do | 20 seconds in lard oil ‡15% sulfur at 500° F. | 282 |
| 457 | do | 30 seconds in lard oil ‡15% sulfur at 500° F. | 290 |
| 458 | do | 2 minutes in lard oil ‡15% sulfur at 500° F. | 330 |
| 459 | do | 5 minutes in lard oil ‡15% sulfur at 500° F. | 286 |
| 460 | do | Treated with saturated aqueous $H_2S$ to produce thin smooth black film. | 368 |
| 461 | do | Treated with saturated polysulfide — hot — to produce grayish to black films. | 400 |
| 463 | do | Treated with dilute 10% $H_3PO_4$ saturated with $Fe_3(PO_4)_2$ 30 min. | 566 |
| 464 | do | Treated with dilute 10% $H_3PO_4$ saturated with $Fe_3(PO_4)_2$ 1 hr. 30 min. | 568+ |

*\*This machine is of the type described in the S. A. E. Journal of December, 1933 at page 402.*

As shown by the above data ferrous metal surfaces pretreated according to the invention and lubricated with a non-corrosive extreme pressure lubricant withstand loads in the Almen machine approximately three times that of untreated surfaces lubricated with the same extreme pressure lubricants. In the Timken accelerated test the load carrying capacity is almost doubled by the pretreatment. In the third testing machine, the load at failure is increased as much as 6.5 times. Gears treated according to the invention can be satisfactorily "run in" with non-corrosive extreme pressure lubricants without danger of scuffing or seizure, even under high loads and speeds.

In carrying out the present invention it is preferable to lubricate the treated surfaces with a non-corrosive extreme pressure lubricant in which the active ingredient is of the same type as that used in the pretreatment, that is, if the pretreatment is such as to form a sulfide film, the non-corrosive extreme pressure lubricant should preferably be of the sulfur bearing type; if the pretreatment forms a phosphate film the active element of the lubricant should preferably be of the phosphate type. However, the invention is not limited to this particular combination.

While the invention provides a means for running in raw gears with non-corrosive extreme pressure lubricants, it is also applicable to use with extreme pressure lubricants that are mildly corrosive. For conditions of operation in which very active or corrosive extreme pressure lubricants are required to prevent scuffing during running in, less corrosive extreme pressure lubricants can be made usable and satisfactory by pretreating the frictional surface as herein described. For example, corrosive extreme pressure lubricants containing up to 1% free sulfur have been found inadequate to prevent scuffing of gears under certain breaking-in conditions. This same lubricant prevents such scuffing under the same conditions when used with gears pretreated according to the invention.

While in many cases the film formed by our pretreatment is eventually removed by wear, tests have shown that the scoring of new frictional surfaces generally occurs in the early stages of use, particularly when heavily loaded. Our pretreatment provides a protecting film which is resistant to extreme pressures, and which prevents scoring or seizing during this initial critical period. Consequently our invention also has utility for breaking in machine elements where the problem is merely to insure proper initial wearing in of new parts and it is not necessary or desirable to use extreme pressure lubricants.

The phenomenon responsible for the surprising results obtained by combining our pretreatment with the use of non-corrosive extreme pressure lubricants may be a catalytic one. The preformed films themselves are worn off in use by friction. However, these preformed films seem to act as a catalyst and facilitate reforming of a new film by the non-corrosive extreme pressure lubricant as soon as parts of the old film are worn off. In the absence of these preformed films, the noncorrosive extreme pressure lubricants are less efficient in preventing scuffing or seizure during "running in" of metal parts, presumably because initial formation of the film takes place more slowly. Irrespective of the above catalytic theory, which is not to be regarded as essential to the invention, we have discovered a physical effect resulting from a particular combination of process steps which greatly facilitates the lubrication of hypoid gears and other mechanical elements where ferrous metal to ferrous metal sliding contact under high pressures is involved.

The pretreatment described in this invention is applicable to piston rings and/or cylinder liners of internal combustion engines and when applied thereto facilitates breaking in of a new motor.

In the description of this invention reference has been made specifically to preforming sulfide films. The inventive idea in its broad aspect obviously is not limited to the sulfide type film, but is applicable in general to films formed by chemical reaction with ferrous metal surfaces and particularly to those of the type produced by extreme pressure lubricating compounds whatever the active ingredient. The film may be formed either by a treatment in the extreme pressure lubricant itself or by treatment in the active ingredient of such lubricants. Thus the formation of iron halogen, iron phosphate, iron selenide, iron telluride, and other non-metallic films which act to prevent scuffing, scoring or seizure of frictional metallic surfaces is regarded as falling within the broad scope of the invention.

This application is directed to a species of the invention claimed in our continuation-in-part application, Serial No. 235,542, filed October 17, 1938, now United States Patent No. 2,266,377, issued December 16, 1941.

We claim:

1. A process of improving the load carrying capacity of a machine element having a ferrous metal frictional bearing surface machined to final dimensions and normally subjected to lubrication under extreme pressure conditions ordinarily tending to cause scuffing and scoring of said surface, said process comprising chemically treating, prior to use, said ferrous metal frictional surface, with a colloidal suspension of sulfur and heating to cause reaction of said sulfur with said surface to form an integral lubricating film, lubricating said surfaces with a mineral lubricant and subjecting said surfaces to frictional contact under extreme pressure.

2. A process of improving the load carrying capacity of a machine element having a ferrous metal frictional bearing surface machined to final dimensions and normally subjected to lubrication under extreme pressure conditions ordinarily tending to cause scuffing and scoring of said surface, said process comprising chemically treating prior to use, said ferrous metal frictional surface, by tempering said element and at least partially quenching the same in a treating bath containing an active component of an extreme pressure lubricant to form thereon a lubricating film comprising the reaction product of said ferrous metal and said active component of an extreme pressure lubricant, lubricating said surfaces with a mineral lubricant and subjecting said surface to frictional contact under extreme pressure.

GEORGE LEONARD NEELY.
BRUCE B. FARRINGTON.
VICTOR N. BORSOFF.